US009175963B2

United States Patent
Kelly

(10) Patent No.: US 9,175,963 B2
(45) Date of Patent: Nov. 3, 2015

(54) DEAD RECKONING BASED INITIALIZATION OF POSITION AND HEADING USING DISCRETE POSITION INDICATORS

(71) Applicant: mCube Inc., San Jose, CA (US)

(72) Inventor: Joseph M. Kelly, San Jose, CA (US)

(73) Assignee: mCube Inc., San Jose, CA (US)

( * ) Notice: Subject to any disclaimer, the term of this patent is extended or adjusted under 35 U.S.C. 154(b) by 336 days.

(21) Appl. No.: 14/152,890

(22) Filed: Jan. 10, 2014

(65) Prior Publication Data
US 2015/0285637 A1    Oct. 8, 2015

Related U.S. Application Data

(60) Provisional application No. 61/751,210, filed on Jan. 10, 2013.

(51) Int. Cl.
| | | |
|---|---|---|
| G01C 21/00 | (2006.01) | |
| G01C 21/12 | (2006.01) | |
| G01C 21/34 | (2006.01) | |
| H04W 4/00 | (2009.01) | |

(52) U.S. Cl.
CPC .............. *G01C 21/12* (2013.01); *H04W 4/008* (2013.01)

(58) Field of Classification Search
USPC .................... 701/400, 472, 495, 498
See application file for complete search history.

(56) References Cited

U.S. PATENT DOCUMENTS

| | | | | |
|---|---|---|---|---|
| 5,111,401 | A * | 5/1992 | Everett et al. ................ | 701/24 |
| 6,024,655 | A * | 2/2000 | Coffee ......................... | 473/407 |
| 2011/0184644 | A1* | 7/2011 | McBurney et al. ........... | 701/208 |
| 2011/0191024 | A1* | 8/2011 | DeLuca ....................... | 701/216 |
| 2011/0257882 | A1* | 10/2011 | McBurney et al. ........... | 701/208 |

* cited by examiner

*Primary Examiner* — Yonel Beaulieu
(74) *Attorney, Agent, or Firm* — Kilpatrick Townsend and Stockton LLP

(57) ABSTRACT

A method and system for operating a hand-held computer system for navigation. Embodiments of the present invention includes novel improvements to a navigation method and implementation through a device, which can include inertial and/or magnetic field sensors integrated within a hand held device. The method can include using a single-fix method or a dual-fix method. The single fix method includes monitoring travel distance or time for a pre-specified condition and updating the heading from a dead reckoning process based on a first position fix by using a map. The dual-fix method includes obtaining a second position fix and updating the heading based on the difference in displacement vectors from the dead reckoning process based on the first position fix.

13 Claims, 4 Drawing Sheets

DEAD RECKONING BASED INITIALIZATION OF POSITION AND HEADING USING DISCRETE POSITION INDICATORS

CROSS-REFERENCE TO RELATED APPLICATIONS

This application claims priority to and is a non-provisional patent application of U.S. Ser. No. 61/751,210, filed Jan. 10, 2013, that is incorporated by reference herein, for all purposes. This application is also related to the following U.S. patent applications: U.S. patent application Ser. No. 13/755,242, filed on Jan. 31, 2013, U.S. patent application Ser. No. 13/776,525, filed on Feb. 25, 2013, U.S. patent application Ser. No. 13/837,411, filed on Mar. 15, 2013, and U.S. patent application Ser. No. 13/804,944, filed on Mar. 14, 2013. All of the above applications are commonly owned and incorporated in their entirety by reference herein for all purposes.

BACKGROUND OF THE INVENTION

The present invention is directed to navigational devices and methods for navigation. More specifically, embodiments of the invention provide a method and system for operating a hand-held computer system for navigation and the like.

The use of navigational tools within portable handheld devices has been widespread in contemporary society. The ability to quickly and accurately determine a user's location and heading toward a desired destination is highly desirable. Conventional tools for navigation have included systems that implement GPS or other Radio-Frequency based positional methods. However, these methods require frequent updating to remain accurate. As GPS and other Radio Frequency based positional become either degraded or completely unavailable, systems that utilize these methods are rendered useless.

From the above, it is seen that techniques for improving operation of navigational systems and methods are highly desired.

BRIEF SUMMARY OF THE INVENTION

The present invention is directed to navigational devices and methods for navigation. More specifically, embodiments of the invention provide a method and system for operating a hand-held computer system for navigation and the like. These navigational systems can include physical sensors such as MEMS devices and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Embodiments of present invention address the problem of determining the position of a person or an electronic device inside a building, when systems such as GPS and other Radio-Frequency based positioning are either degraded or completely unavailable. The increasing presence of sources of position information in an indoor environment, such as permanently mounted Near-Field Communications (NFC) tags, Wi-Fi wireless access points, or other beacons such as Bluetooth devices or the Japanese augmentation to the Quasi-Zenith Satellite System (QZSS) called the Indoor Messaging System (IMES), offer an ability to periodically determine user location within a short distance. These positioning sources are only useful when the user is very near one of the physical transmitters or transponders, whether active or passive, and this invention describes an algorithm for using dead reckoning information from sensors (inertial, magnetic, and/or optical) to leverage information from these sensors to initialize the dead reckoning navigation processing in both position and heading. This dead reckoning solution may then be used to provide much higher rate, lower latency, and higher availability positioning information than the beacon or tagging systems can provide by themselves.

Embodiments of the present invention allows accurate initialization of heading in a dead reckoning system even when absolute position information comes at infrequent and non-deterministic times, when a more conventional navigation data blending approach, such as a Kalman Filter, might have significant convergence, linearity, and stability problems. It also has very low computer processing requirements compared to a multi-dimensional Kalman Filter or other more formalized and widely used estimators.

Some conventional approaches that aim to provide indoor positioning information are focusing on using external data sources such as Wi-Fi-based positioning. Others approaches are still focusing on dead reckoning using sensors and periodically reset navigation information when external position is received. It is recognized that the ability of a dead reckoning solution to track relative position and heading change information over time can be used to look backward over a segment of travel, and can use sparse yet accurate position fixes to self-align not only position, but user heading as well. Heading estimation has traditionally been the hardest problem to solve in a dead reckoning navigation system, and embodiments of the present invention illustrate an approach that is believed to be novel in that it uses information from a system that only provides very infrequent position updates at completely unknown and unknowable data intervals to estimate the user dead reckoning heading, and thus allowing better coasting and higher availability of an indoor location solution.

Embodiments of the present invention utilize very accurate dead reckoning navigation solutions as a means to track changes in position and heading even when a substantial error exists in the user heading estimate. Sparse and infrequent positioning information, such as that obtained from NFC tags, IMES or Bluetooth beacons, or Wi-Fi Access Points, can be used to calibrate/align the dead reckoning solution to allow longer coasting times for indoor navigation. Other schemes that blend position information will require more frequency absolute position updates such as GPS or full Wi-Fi positioning processing that employs tri-lateration processing or similar methods. Schemes that align heading without any position or map information rely on a magnetic compass, which can have very large errors and require that an electronic device be held in a particular orientation, which may be unacceptable in many use cases identified for the consumer market, where cell phones (as an example) are stored in a pockets, held in the hand and swung while walking, or held out in front of a user to view the screen.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to navigational devices and methods for navigation. More specifically, embodiments of the invention provide a method and system for operating a hand-held computer system for navigation and the like. These navigational systems can include physical sensors such as MEMS devices and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Embodiments of present invention address the problem of determining the position of a person or an electronic device inside a building, when systems such as GPS and other Radio-Frequency based positioning are either degraded or completely unavailable. The increasing presence of sources of position information in an indoor environment, such as permanently mounted Near-Field Communications (NFC) tags, Wi-Fi wireless access points, or other beacons such as Bluetooth wireless devices (e.g., an iBeacon or other means of using a Bluetooth signal being transmitted through space as a source of position information), or the Japanese augmentation to the Quasi-Zenith Satellite System (QZSS) called the Indoor Messaging System (IMES), offer an ability to periodically determine user location within a short distance. These positioning sources are only useful when the user is very near one of the physical transmitters or transponders, whether active or passive, and this invention describes an algorithm for using dead reckoning information from sensors (inertial, magnetic, and/or optical) to leverage information from these sensors to initialize the dead reckoning navigation processing in both position and heading. This dead reckoning solution may then be used to provide much higher rate, lower latency, and higher availability positioning information than the beacon or tagging systems can provide by themselves.

Embodiments of the present invention allows accurate initialization of heading in a dead reckoning system even when absolute position information comes at infrequent and non-deterministic times, when a more conventional navigation data blending approach, such as a Kalman Filter, might have significant convergence, linearity, and stability problems. It also has very low computer processing requirements compared to a multi-dimensional Kalman Filter or other more formalized and widely used estimators.

Further details regarding the embodiments of the present invention and its implementation are described in the accompanying examples and figures.

Figure 1:
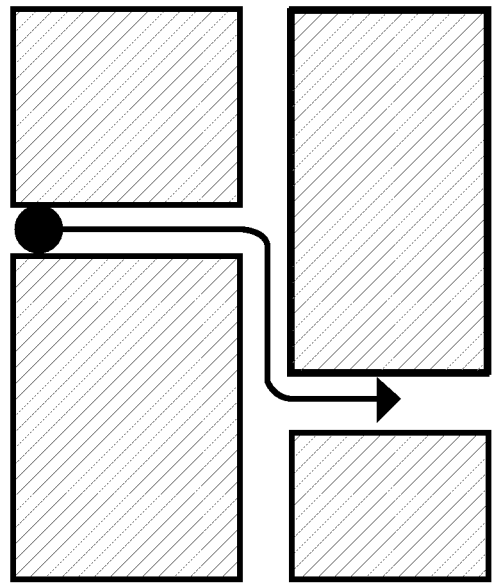
FIG. 1 is a simplified diagram illustrating an indoor navigation scenario according to an embodiment of the present invention.

FIG. 1 is a simplified diagram illustrating an indoor navigation scenario according to an embodiment of the present invention. FIG. 1 illustrates a user position fix and subsequent travel path through known corridors contained in an electronic representation of a map. Case 1: Single position fix and map/hallway heading information—In this case, a user of an electronic device with dead reckoning capability will get an indication when he is at a known location that can be represented on an electronic map, and will then walk away from that location as shown in FIG. 1, where the circle represents a known position fix and the line represents the user path of travel.

Figure 2:
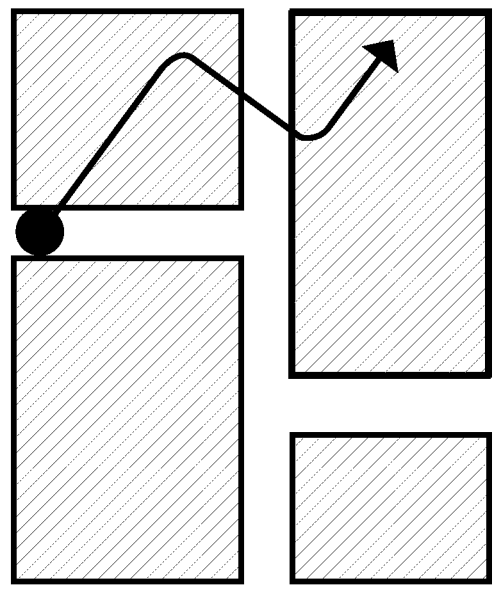
FIG. 2 is a simplified diagram illustrating an indoor navigation scenario according to an embodiment of the present invention.

For a specified time period or walking distance following that position indication, the dead reckoning positioning solution is computed in the electronic device, and has errors that may grow large due to initial heading errors and uncertainty, as shown in FIG. 2.

FIG. 2 is a simplified diagram illustrating an indoor navigation scenario according to an embodiment of the present invention. FIG. 2 shows a computed dead reckoning user position following position fix with erroneous heading. After this time period or walking distance (as determined by the dead reckoning) has passed, the navigation path segment, consisting of a set of points in space, is compared with possible paths of travel on a map. Inconsistencies between the headings of various path segments are estimated using vector arithmetic or trigonometric functions in the navigation processing, and used to correct the dead reckoning heading and position. This correction can be computed in several ways, but the basic quantities to be updated are as follow:

$$\text{Updating Heading: } h = h_o + \Delta h \tag{E-1}$$

$$\text{Updating Position: } \vec{r} = \vec{r}_1 + C(\vec{r}_o - \vec{r}_1) \tag{E-2}$$

Where:
  $h_o$=Current heading prior to correction
  $\Delta_h$=Heading correction computed from processing
  $\vec{r}_1$=Location of user when position fix occurred
  $\vec{r}_o$=Current location of user prior to correction
  C=Direction cosine matrix that uses $\Delta h$ to rotate path segment When navigating on a two-dimensional plane such as a floor map, which will be the most common case for indoor navigation, the direction cosine matrix can be computed as:

$$C = \begin{bmatrix} \cos(\Delta h) & -\sin(\Delta h) \\ \sin(\Delta h) & \cos(\Delta h) \end{bmatrix}$$

Figure 3:
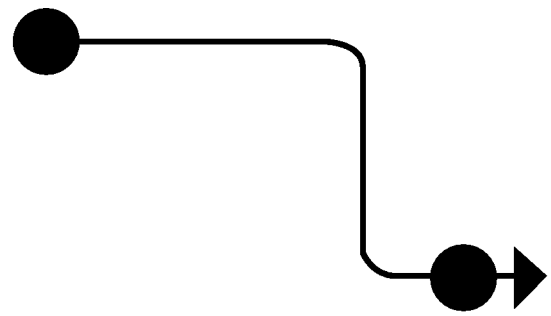
FIG. 3 is a simplified diagram illustrating an indoor navigation scenario according to an embodiment of the present invention.

FIG. 3 is a simplified diagram illustrating an indoor navigation scenario according to an embodiment of the present invention. Case 2: Dual position fixes—A user of an electronic device with dead reckoning capability will get an indication when he is at a known location, and upon walking away from that location along an arbitrary unconstrained path, will compute that path, which will be in error due to heading error/uncertainty. This is shown in FIG. 3 as the user path of travel between two position fixes. The user/device will receive a second indication when at a second known location. This second location can be used along with the accumulated dead reckoning path to determine a "true" displacement vector and a "computed" displacement vector, such that a heading error can be computed as the angle between them. For the true user walking path shown in FIG. 3, the two circles represent the two known locations reported at separate points along the path of travel.

Figure 4:
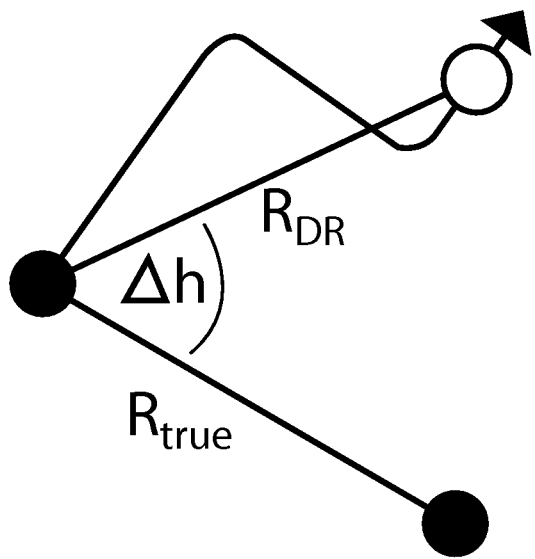
FIG. 4 is a simplified diagram illustrating an indoor navigation scenario according to an embodiment of the present invention.

FIG. 4 is a simplified diagram illustrating an indoor navigation scenario according to an embodiment of the present invention. In the computed dead reckoning solution, the heading error causes an erroneous path segment to be generated, up to the point where the second location is reached, as shown in FIG. 4. The third (white fill) circle represents the computed user location at the point when the second position fix is made.

When the second location is reached, the total displacement vectors, "$R_{SR}$" and "$R_{true}$", which represents the computed dead reckoning displacement from the initial position fix, and the true displacement from the initial position fix (computed using known position beacon/indicator locations) can be manipulated with basic vector arithmetic or trigonometric techniques. The position can be updated directly to the second position fix location, and the heading will still be updated using the same approach as in the single-fix technique:

$$\text{Updating Heading: } h = h_o + \Delta h$$

Figure 5:
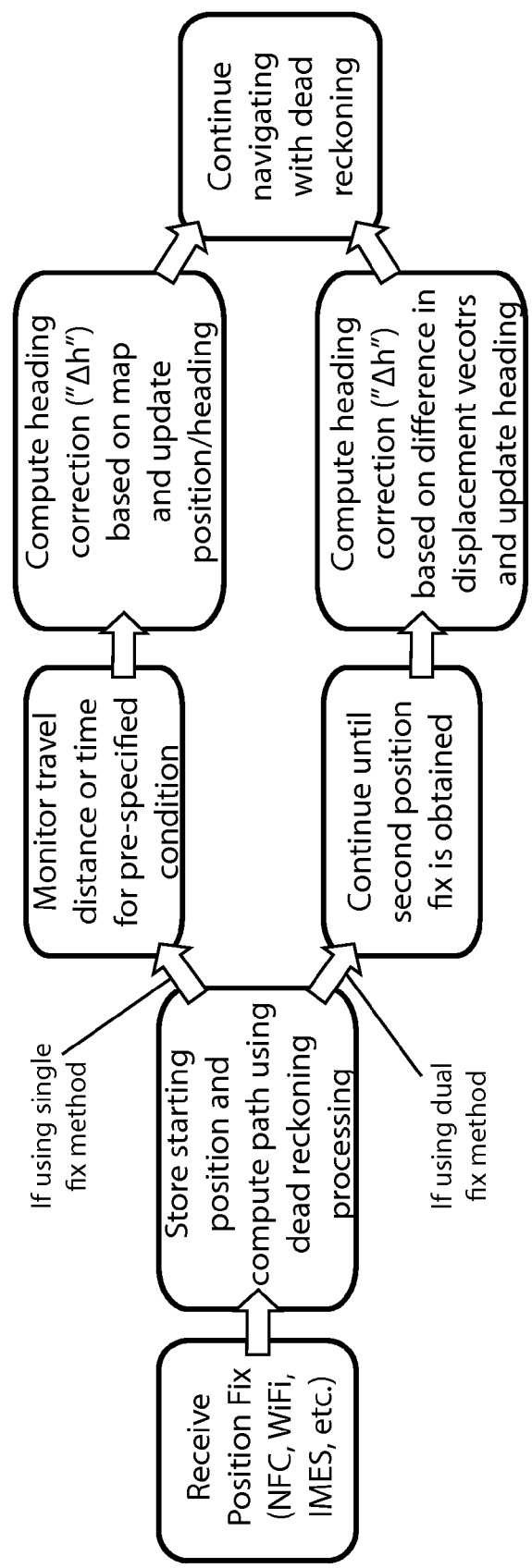
FIG. 5 is a simplified flow diagram illustrating a method of navigation according to an embodiment of the present invention.

FIG. 5 is a simplified flow diagram illustrating a method of navigation according to an embodiment of the present invention. As shown, the flow diagram represents an embodiment of a navigation method using an algorithm flow for position fix based initialization of dead reckoning position and heading. Because many of the processing techniques used for these two techniques are similar, the two alternate techniques in this invention can be summarized in a single flow chart with two branches, as shown in FIG. 5.

Sometime after the start-up of dead reckoning navigation, a position fix is obtained, from a Near Field Communication (NFC) tag, an Indoor Messaging System (IMES) beacon, a Bluetooth device, a Wi-Fi Access Point, or some other means that provides accurate (room level or better) position with high confidence. The dead reckoning path is computed after this point using sensors in the electronic device, which can consist of accelerometers, gyroscopes, magnetometers, pressure sensors, step detectors/counters, image/optical techniques, or any other method that allows the relative changes in position and orientation to be estimated over time. If a user or the control electronics has selected the "single-fix" approach described above, then accumulated dead reckoning solution is monitored until a stop condition is met, at which point the computed path segment is compared against map information, which can be path segments representing corridors, hallways, doors, or any other mathematical or electronic representation of permitted paths of pedestrian travel. The heading error determined from this comparison is fed back to the original heading as a correction, as indicated by the equations E-1, and the position is corrected as indicated by the equation E-2. If the dual-fix approach is selected, then the dead reckoning navigation solution is computed until the point at which a second position fix is obtained. Once the second fix is received, the "truth" and "computed" vectors are estimated as shown in FIG. 4, and the resulting heading correction is used to update the dead reckoning heading as indicated in equation E-1. Dead reckoning position is immediately set to the location of the second position fix. Once position and heading are corrected, regardless of which approach is used, dead reckoning processing can commence as normal.

Some conventional approaches that aim to provide indoor positioning information are focusing on using external data sources such as Wi-Fi-based positioning. Others approaches are still focusing on dead reckoning using sensors and periodically reset navigation information when external position is received. It is recognized that the ability of a dead reckoning solution to track relative position and heading change information over time can be used to look backward over a segment of travel, and can use sparse yet accurate position fixes to self-align not only position, but user heading as well. Heading estimation has traditionally been the hardest problem to solve in a dead reckoning navigation system, and embodiments of the present invention illustrate an approach that is believed to be novel in that it uses information from a system that only provides very infrequent position updates at completely unknown and unknowable data intervals to estimate the user dead reckoning heading, and thus allowing better coasting and higher availability of an indoor location solution.

Embodiments of the present invention utilize very accurate dead reckoning navigation solutions as a means to track changes in position and heading even when a substantial error exists in the user heading estimate. Sparse and infrequent positioning information, such as that obtained from NFC tags, IMES or Bluetooth beacons, or Wi-Fi Access Points, can be used to calibrate/align the dead reckoning solution to allow longer coasting times for indoor navigation. Other schemes that blend position information will require more frequency absolute position updates such as GPS or full Wi-Fi positioning processing that employs tri-lateration processing or similar methods. Schemes that align heading without any position or map information rely on a magnetic compass, which can have very large errors and require that an electronic device be held in a particular orientation, which may be unacceptable in many use cases identified for the consumer market, where cell phones (as an example) are stored in a pockets, held in the hand and swung while walking, or held out in front of a user to view the screen.

In an embodiment, the present invention includes a computer implemented method for navigation performed by a hand-held computer system programmed to perform the method. This method includes receiving a first position fix; storing a starting position; computing a navigation path having a navigation heading using a dead reckoning process; monitoring for a pre-specified condition; computing a heading correction based on a map upon detection of the pre-specified condition; and updating the navigation heading using the heading correction.

In a specific embodiment, the first position fix can be obtained from a Near Field Communication (NFC) tag, an Indoor Messaging System (IMES) beacon, a Bluetooth device, or a Wi-Fi access point. The hand-held computer system can include a memory. Storing a starting position can include storing a starting position in the memory. The hand-held computer system can include a physical sensor selected from an accelerometer, a gyroscope, a magnetometer, or a pressure sensor. The dead reckoning process can include computing the navigation path using the physical sensor. The pre-specified condition includes an acceleration condition, an angular rotation condition, a magnetic field condition, or a pressure condition. The hand-held computer system can include a display. Updating the navigation heading includes displaying the navigation heading on the display.

In an embodiment, the present invention includes a computer implemented method for navigation performed by a hand-held computer system programmed to perform the method. This method can include receiving a first position fix;

storing a starting position; compute a navigation path using a dead reckoning process, the navigation path having a navigation heading and a dead reckoning displacement vector; receiving a second position fix; computing a heading correction using the difference between the dead reckoning displacement vector and a displacement vector based on the second position fix; and updating the navigation heading using the heading correction. The second position fix, like the first position fix, can be obtained from an NFC tag, an IMES beacon, a Bluetooth device, or a Wi-Fi access point, or the like. Specific embodiments can include similar items described previously.

Figure 6:
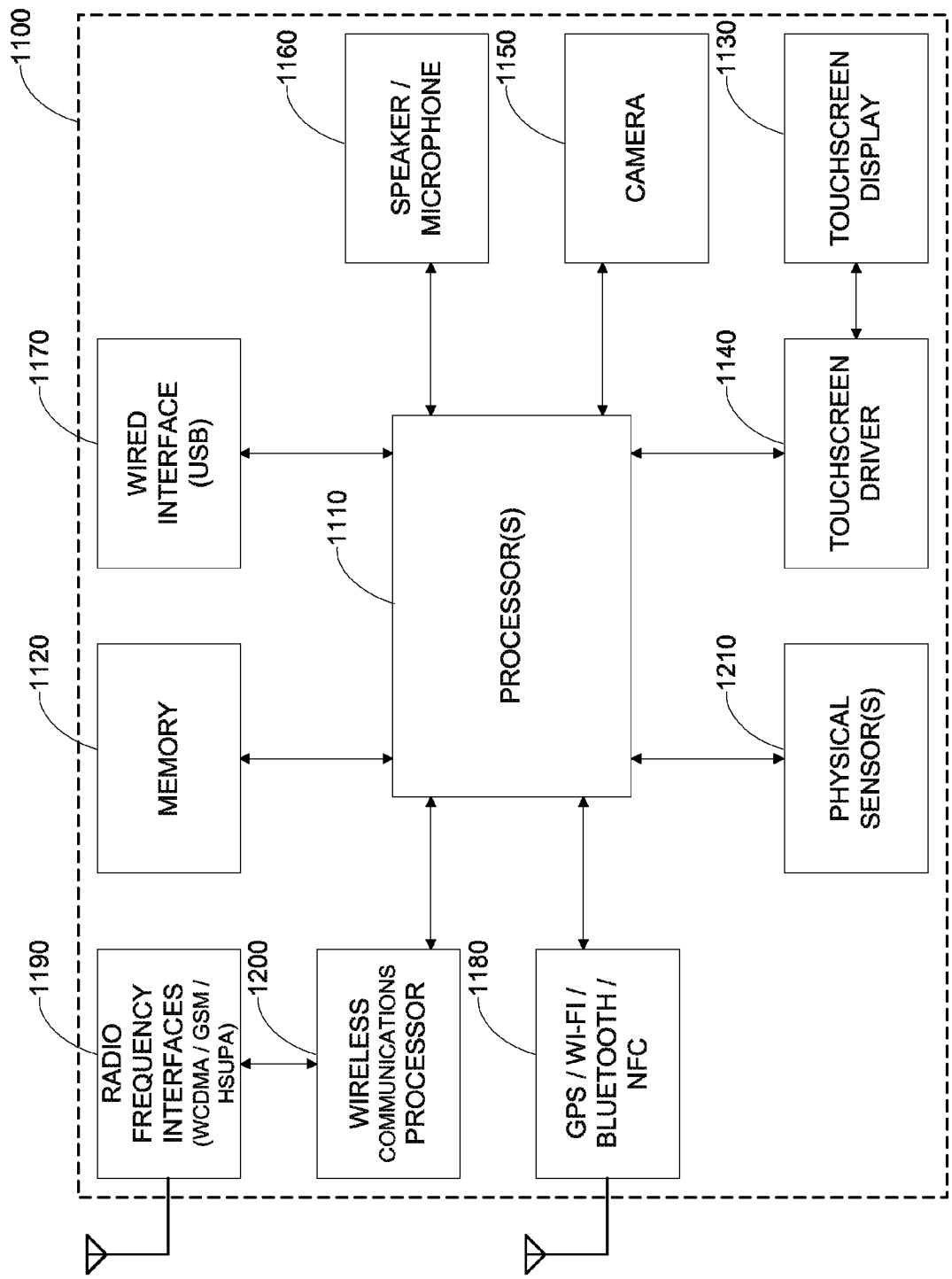
FIG. 6 is a simplified block diagram illustrating a handheld device according to an embodiment of the present invention.

FIG. 6 illustrates a functional block diagram of various embodiments of the present invention. In FIG. 6, a computing device 1100 typically includes an applications processor 1110, memory 1120, a touch screen display 1130 and driver 1140, an image acquisition device 1150, audio input/output devices 1160, and the like. Additional communications from and to computing device are typically provided by via a wired interface 1170, a GPS/Wi-Fi/Bluetooth interface 1180, RF interfaces 1190 and wireless communication processor 1200, and the like. Also included in various embodiments are physical sensors 1210.

In various embodiments, computing device 1100 may be a hand-held computing device (e.g. Apple iPad, Apple iTouch, Lenovo Skylight/IdeaPad, Asus EEE series, Microsoft 8 tablet, Samsung Galaxy Tab, Android Tablet), a portable telephone (e.g. Apple iPhone, Motorola Droid series, Google Nexus S, HTC Sensation, Samsung Galaxy S series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 1100 may include one or more processors 1110. Such processors 1110 may also be termed application processors, and may include a processor core, a video/graphics core, and other cores. Processors 1110 may be a processor from Apple (A4/A5), Intel (Atom), NVidia (Tegra 3, 4, 5), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR -SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 1120 may include different types of memory (including memory controllers), such as flash memory (e.g. NOR, NAND), pseudo SRAM, DDR SDRAM, or the like. Memory 1120 may be fixed within computing device 1100 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 1130 and driver 1140 may be based upon a variety of later-developed or current touch screen technology including resistive displays, capacitive displays, optical sensor displays, electromagnetic resonance, or the like. Additionally, touch screen display 1130 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 1150 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 1160 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 1110 to enable the user to operate computing device 1100 by stating voice commands. Additionally, a speech engine may be provided in various embodiments to enable computing device 1100 to provide audio status messages, audio response messages, or the like.

In various embodiments, wired interface 1170 may be used to provide data transfers between computing device 1100 and an external source, such as a computer, a remote server, a storage network, another computing device 1100, or the like. Such data may include application data, operating system data, firmware, or the like. Embodiments may include any later-developed or conventional physical interface/protocol, such as: USB 4.0, 5.0, micro USB, mini USB, Firewire, Apple iPod connector, Ethernet, POTS, or the like. Additionally, software that enables communications over such networks is typically provided.

In various embodiments, a wireless interface 1180 may also be provided to provide wireless data transfers between computing device 1100 and external sources, such as computers, storage networks, headphones, microphones, cameras, or the like. As illustrated in FIG. 6, wireless protocols may include Wi-Fi (e.g. IEEE 802.11a/b/g/n, WiMax), Bluetooth, IR, near field communication (NFC), ZigBee and the like.

GPS receiving capability may also be included in various embodiments of the present invention, however is not required. As illustrated in FIG. 6, GPS functionality is included as part of wireless interface 1180 merely for sake of convenience, although in implementation, such functionality is currently performed by circuitry that is distinct from the Wi-Fi circuitry and distinct from the Bluetooth circuitry.

Additional wireless communications may be provided via RF interfaces 1190 and wireless communication processor 1200 in various embodiments. In various embodiments, RF interfaces 1190 may support any future-developed or conventional radio frequency communications protocol, such as CDMA-based protocols (e.g. WCDMA), GSM-based protocols, HSUPA-based protocols, or the like. In the embodiments illustrated, wireless communication processor 1200 is illustrated as being distinct from applications processor 1110. However, in some embodiments, these functionality are provided upon a single IC package, for example the Marvel PXA330 processor, and the like. It is contemplated that some embodiments of computing device 400 need not include the RF functionality provided by RF interface 1190 and processor 1200.

FIG. 6 also illustrates computing device 1100 to include physical sensors 1210. In various embodiments of the present invention, physical sensors 1210 are multi-axis Micro-Electro-Mechanical Systems (MEMS) based devices. Physical sensors 1210 currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 400 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 1210 are manufactured using a foundry-compatible process. As explained in such applications, because the process for manufacturing such physical sensors can be performed on a standard CMOS fabrication facility, it is expected that there will be a broader adoption of such components into computing device 1100. In other embodiments of the present invention, conventional physical sensors 1210 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 5.x, 4.x), Symbian, or the like. In various embodiments of the present invention, the operating system may be a multi-threaded multi-tasking operating system. Accordingly, inputs and/or outputs from and to touch screen display 1130 and driver 1140 and inputs/or outputs to physical sensors 1210 may be processed in parallel processing threads. In other embodiments, such events or outputs may be processed serially, or the like. Inputs and outputs from other functional blocks may also be processed in parallel or serially, in other embodiments of the present invention, such as image acquisition device 1150 and physical sensors 1210.

FIG. 6 is representative of one computing device 1100 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 6. For example, in various embodiments, computing device 1100 may lack image acquisition unit 1150, or RF interface 1190 and/or driver 1200, or GPS capability, or the like. Additional functions may also be added to various embodiments of computing device 1100, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for navigation performed by a hand-held computer system programmed to perform the method comprising:
receiving a first position fix;
storing a starting position;
compute a navigation path using a dead reckoning process, the navigation path having a navigation heading and a dead reckoning displacement vector;
receiving a second position fix;
computing a heading correction using the difference between the dead reckoning displacement vector and a displacement vector based on the second position fix, wherein computing a heading correction using the difference between the dead reckoning displacement vector and a displacement vector based on the second position fix is executed under a dual fix condition; and
updating the navigation heading using the heading correction.

2. The method of claim 1 wherein the first position fix is obtained from a Near Field Communication (NFC) tag, an Indoor Messaging System (IMES) beacon, a Bluetooth Wireless device, or a Wi-Fi access point.

3. The method of claim 1 wherein the hand-held computer system comprises a memory; and wherein storing a starting position comprises storing a starting position in the memory.

4. The method of claim 1 wherein the hand-held computer system includes a physical sensor selected from an accelerometer, a gyroscope, a magnetometer, or a pressure sensor; wherein the dead reckoning process includes computing the navigation path using the physical sensor.

5. The method of claim 1 wherein the second position fix is obtained from a Near Field Communication (NFC) tag, an Indoor Messaging System (IMES) beacon, a Bluetooth wireless device, or a Wi-Fi access point.

6. The method of claim 1 wherein the hand-held computer system includes a display; and wherein updating the navigation heading includes displaying the navigation heading on the display.

7. A computer implemented method for navigation performed by a hand-held computer system programmed to perform the method comprising:
receiving a first position fix;
storing a starting position;
compute a navigation path using a dead reckoning process, the navigation path having a navigation heading and a dead reckoning displacement vector;
monitoring for a pre-specified condition;
receiving a second position fix;
computing a heading correction based on a map upon detection of the pre-specified condition;

computing a heading correction using the difference between the dead reckoning displacement vector and a displacement vector based on the second position fix, wherein computing a heading correction using the difference between the dead reckoning displacement vector and a displacement vector based on the second position fix is executed under a dual fix condition; and updating the navigation heading using the heading correction.

8. The method of claim 7 wherein the first and second position fixes are obtained from a Near Field Communication (NFC) tag, an Indoor Messaging System (IMES) beacon, a Bluetooth wireless device, or a Wi-Fi access point.

9. The method of claim 7 wherein the hand-held computer system includes a physical sensor selected from an accelerometer, a gyroscope, a magnetometer, or a pressure sensor; wherein the dead reckoning process includes computing the navigation path using the physical sensor.

10. The method of claim 7 wherein the pre-specified condition includes an acceleration condition, an angular rotation condition, a magnetic field condition, or a pressure condition.

11. The method of claim 7 wherein the hand-held computer system comprises a memory; and wherein storing a starting position comprises storing a starting position in the memory.

12. The method of claim 7 wherein the hand-held computer system includes a display; and wherein updating the navigation heading includes displaying the navigation heading on the display.

13. The method of claim 7 wherein computing a heading correction based on a map upon detection of the pre-specified condition is executed in under a single fix condition.

\* \* \* \* \*